US011863570B2

(12) United States Patent
Yang et al.

(10) Patent No.: US 11,863,570 B2
(45) Date of Patent: Jan. 2, 2024

(54) BLOCKCHAIN-BASED NETWORK SECURITY SYSTEM AND PROCESSING METHOD (71) Applicant: SHANGHAI NEWDON TECHNOLOGY CO., LTD., Shanghai (CN)

(72) Inventors: Tengxiao Yang, Shanghai (CN); Zheng Xiao, Shanghai (CN); Tao Yan, Shanghai (CN)

(73) Assignee: SHANGHAI NEWDON TECHNOLOGY CO., LTD., Shanghai (CN)

( * ) Notice: Subject to any disclaimer, the term of this patent is extended or adjusted under 35 U.S.C. 154(b) by 332 days.

(21) Appl. No.: 17/598,681

(22) PCT Filed: Mar. 24, 2020

(86) PCT No.: PCT/CN2020/080925
§ 371 (c)(1),
(2) Date: Sep. 27, 2021

(87) PCT Pub. No.: WO2020/192659
PCT Pub. Date: Oct. 1, 2020

(65) Prior Publication Data
US 2022/0159019 A1   May 19, 2022

(30) Foreign Application Priority Data

Mar. 27, 2019 (CN) .......................... 201910235647.5

(51) Int. Cl.
*H04L 9/40* (2022.01)
(52) U.S. Cl.
CPC ...... *H04L 63/1416* (2013.01); *H04L 63/0435* (2013.01); *H04L 63/1425* (2013.01); *H04L 63/1458* (2013.01); *H04L 63/20* (2013.01)

(58) Field of Classification Search
CPC ............ H04L 63/1416; H04L 63/0435; H04L 63/1425; H04L 63/1458; H04L 63/20
(Continued)

(56) References Cited

U.S. PATENT DOCUMENTS

| 11,108,544 B2 * | 8/2021 | Vouk ....................... H04L 63/12 |
| 2018/0218454 A1 * | 8/2018 | Simon .................... H04L 9/3239 |

(Continued)

FOREIGN PATENT DOCUMENTS

| CN | 108616534 A | 10/2018 |
| CN | 108881233 A | 11/2018 |

(Continued)

OTHER PUBLICATIONS

Rodrigues, Bruno et al.; "Multi-domain DDoS Mitigation Based on Blockchains"; Advances in Databases and Information Systems, LNCS 10356; Jun. 17, 2017; pp. 185-190.

(Continued)

*Primary Examiner* — Michael S McNally
(74) *Attorney, Agent, or Firm* — NKL Law; Allen Xue (57) ABSTRACT A blockchain-based network security system is a decentralized anti-attack network constructed by means of blockchain. The anti-attack network includes a blockchain network system and a server system wherein both system are disposed independently and the data link between them is connected via a switch. A plurality of block nodes in the blockchain network system are provided with anti-attack servers, and each anti-attack server is provided with at least one sub-server. When the sub-server of the anti-attack server encounters an abnormal access event, the path information in the access event is loaded into the blockchain network system via the switch connected to the anti-attack server. In one example, the path information in the abnormal access event is loaded into the blockchain network system for (Continued)

distributed processing so as to prevent the resource depletion of the anti-attack server in which the attacked sub-server is located.

10 Claims, 5 Drawing Sheets

(58) Field of Classification Search
USPC .......................................................... 726/22
See application file for complete search history.

(56) References Cited

U.S. PATENT DOCUMENTS

2019/0036906 A1* 1/2019 Biyani .................... H04L 63/08
2020/0162473 A1* 5/2020 Mercuri ............... G06Q 20/065

FOREIGN PATENT DOCUMENTS

| CN | 109377223 A | 2/2019 |
| CN | 109714372 A | 5/2019 |

OTHER PUBLICATIONS

Rodrigues, Bruno et al.; "A Blockchain-Based Architecture for Collaborative DDoS Mitigation with Smart Contracts"; Advances in Databases and Information Systems, LNCS 10356; Year: 2017; pp. 16-29.

* cited by examiner

BLOCKCHAIN-BASED NETWORK SECURITY SYSTEM AND PROCESSING METHOD

TECHNICAL FIELD

The present invention relates to the technical field of blockchain, and in particular to a blockchain-based network security system.

TECHNICAL BACKGROUND

With the emergence and development of the Internet, the security issues of the Internet have become increasingly prominent. Hackers can easily utilize the security vulnerabilities of some Internet smart devices to make them a new tool for traditional network attacks. For example, malicious code are used to infect smart devices and launch DDoS (Distributed Denial of service) to cause serious consequences such as service denial of target and related service offline.

A DDoS attack is mainly to send a large number of seemingly legitimate network packets to the victim host by multiple hosts that have been invaded by the attacker or can be used indirectly, thereby causing network congestion or depletion of server resource and leading to denial of service. Once DDoS is implemented, attacking network packets will attack to the victim host like a flood to submerge the network packets of legitimate users and legitimate users are unable to access the server's network resources normally. Therefore, denial of service attack is also called "flood attack".

For this type of DDoS attack, the traditional detection and defense methods have the following disadvantages. (1) The traditional methods generally detect and defend at the attacked target, but the high-rate data packets and the lack of connection context make the defense scheme at the target only do limited statistical analysis and data packet processing, thereby affecting the timeliness of detection. (2) Since it can not distinguish normal traffic from malicious traffic immediately, after DDoS is detected by the traditional defense scheme deployed at the target, it is necessary to divert all traffics to other network segments for traffic cleaning, and in the process of diversion, it is easy to cause network congestion. Therefore, the traditional detection and defense methods have low timeliness and high cost, and it is difficult to truly and effectively solve the problem of protecting IoT devices from DDoS attacks.

Blockchain is a new form of distributed architecture with universal adaptability, which is now widely used in various fields such as finance, economy, technology, and even politics. Blockchain is technically a special distributed database, while it is a new application mode that combines point-to-point transmission, encryption algorithm, consensus mechanism and other computer technologies. Compared with traditional distributed storage and computing systems, the blockchain uses point-to-point transmission and consensus mechanisms to achieve decentralization, and the information contained in the blocks on the chain is open and transparent to each node on the chain, which solves the problems that may arise in the communication of the distributed computing method.

Based on the above prior art, the present invention proposes a technical solution for constructing a network security system by using a blockchain network system to protect against similar DDoS attack.

SUMMARY OF INVENTION

It is an object of the present invention to provide a blockchain-based network security system and a processing method. The advantages of the invention are as follows: the present invention uses the blockchain-based network system to construct a network security system to protect against similar DDoS attacks. The path information in the aforementioned abnormal access event of the attacked target (sub-server) is loaded into the blockchain network system via a switch connected to an anti-attack server system in which the attacked sub-server is located, so as to perform distributed processing. Blockchain, as a distributed technology, can fulfil the requirement of sharing and analyzing the anomaly detection results among many distributed block nodes, and prevent the resource depletion of the anti-attack server in which the attacked sub-server is located.

To achieve the above object, the present invention provides the technical solutions as follows:

a blockchain-based network security system for constructing a decentralized anti-attack network via a blockchain, wherein the anti-attack network comprises a blockchain network system and a server system which are independently arranged and the data link between them is connected via a switch;

wherein the blockchain network system comprises a plurality of block nodes for constituting the blockchain network, and multiple block nodes of the plurality block nodes are provided with an anti-attack server, and each anti-attack server is provided with at least one sub-server, and multiple anti-attack servers constitute the aforementioned server system;

when the sub-server of the anti-attack server encounters an abnormal access event, the path information in the aforementioned access event is loaded into the aforementioned blockchain network system via the switch connected to the anti-attack server;

for a computer program or application running on the sub-server, it is linked to the blockchain network system via the switch connected to the anti-attack server, so that the computer program or application corresponds to N sub-servers belonging to different anti-attack servers in the entire anti-attack network, wherein N is an integer greater than or equal to 2;

the location information of the N sub-servers corresponding to the aforementioned computer program or application is exchanged via the block information in the blockchain network system, and the path information in the aforementioned abnormal access event is distributed to the N sub-servers.

Furthermore, the each anti-attack server corresponds to multiple independent blockchain network systems, and the data links between the anti-attack server and the multiple independent blockchain network systems are connected via a same switch; and the path information in the aforementioned access event is loaded into any one or more of the multiple blockchain network systems via the aforementioned switch, when the abnormal access event is encountered.

Furthermore, each anti-attack server corresponds to multiple independent blockchain network systems, and the data link between the anti-attack server and each independent blockchain network system is connected via a switch set in a one-to-one correspondence; one or more of the aforementioned switches are selected to load the path information in the aforementioned access event into the corresponding blockchain network system, when an abnormal access event is encountered.

Preferably, at least one blockchain network system of the multiple independent blockchain network systems, to which each of the anti-attack servers corresponds, is connected to other anti-attack networks.

Preferably, for the computer program or application running on the sub-server, each access event in the DDoS attack is distributed respectively by a set of shunt system constructed by the multiple independent blockchain network systems connected to the anti-attack server, and is responded respectively by a superposition of various blockchain network systems.

Furthermore, the sub-server is provided with a detection module and a transmission module, wherein the detection module is configured to detect whether the access event is an abnormal DDoS access event;

the transmission module is configured to send an abnormal access signal to the anti-attack server to which the sub-server network belongs when the access event is an abnormal DDoS access event.

Furthermore, the situation determined as a DDoS abnormal access event is one of the following situations:

the frequency of access request accepted by the computer program or application running on the sub-server is higher than the preset frequency;

there are a large number of TCP connections waiting on the sub-server; or the computer program or application running on the sub-server is flooded with a lot of useless data packets.

The present invention further provides a blockchain-based network security processing method for constructing a decentralized anti-attack network via a blockchain, wherein the anti-attack network comprises a blockchain network system and a server system which are independently arranged and a data link between them is connected via a switch; the blockchain network system comprises a plurality of block nodes for constituting a blockchain network, and multiple block nodes of the plurality of block nodes are provided with an anti-attack server, and each anti-attack server is provided with at least one sub-server, and multiple anti-attack servers constitute the aforementioned server system;

wherein, the method comprises: when the sub-server of the anti-attack server encounters an abnormal access event, loading the path information in the aforementioned access event into the aforementioned blockchain network system via the switch connected to the anti-attack server.

Furthermore, the method further comprises a step of exchanging location information of the sub-server with respect to the computer program or application running on the sub-server, and the step is:

linking the computer program or application running on the sub-server to the blockchain network system via the switch connected to the anti-attack server, so that the computer program or application corresponds to N sub-servers belonging to different anti-attack servers in the entire anti-attack network, wherein N is an integer greater than or equal to 2; and exchanging the location information of the N sub-servers corresponding to the aforementioned computer program or application via the block information in the blockchain network system, and distributing the path information in the aforementioned abnormal access event to the N sub-servers.

Compared with the prior art, the present invention, as examples, has the following advantages and positive effects due to the above technical solutions. The use of a blockchain network system to construct a network security system to protect against similar DDoS attacks, and the path information in the aforementioned abnormal access events of the attacked sub-server is loaded into the connected blockchain network system via the switch connected to the anti-attack server system in which the attacked sub-server is located, so as to perform distributed processing. Blockchain, as a distributed technology, can fulfil the requirement of sharing and analyzing the anomaly detection results among many distributed block nodes, and prevent the resource depletion of the anti-attack server in which the attacked sub-server is located. At the same time, the attack data is defended by the server system outside the blockchain network, and the blockchain network undertakes the data sharing and distribution functions and does not need to perform direct defense processing, so that it can also prevent the server resources in the blockchain network from depletion.

DESCRIPTION OF REFERENCE SIGNS blockchain network system 100, block node 110; server system 200, anti-attack server 210, sub-server 211; switch 300.

DETAILED DESCRIPTION OF INVENTION

The following describes the blockchain-based network security system and processing method disclosed in the present invention in further detail with reference to the accompanying drawings and specific embodiments. It should be noted that the technical features or combinations of technical features described in the following embodiments should not be considered as isolated, and they can be combined with each other to achieve better technical effects. In the drawings of the following embodiments, the same reference numerals appearing in the drawings represent the same features or components, which can be applied to different embodiments. Therefore, once an item is defined in one figure, it does not need to be further discussed in subsequent figures.

It should be noted that the structures, proportions, sizes, etc. shown in the drawings attached to this specification are only used to match the content disclosed in the specification for the reading and understanding for the person familiar with this technology, and are not used as limitation to limit the implementation of the invention. Any structural modification, proportional relationship change or size adjustment should fall within the scope of the technical content disclosed by the invention without affecting the effects and objectives that can be achieved by the invention. The scope of the preferred embodiments of the present invention includes additional implementations in which functions may be performed out of the order described or discussed (including in a substantially simultaneous manner or in the reverse order according to the functions involved), which should be understood by those skilled in the art to which the embodiments of the present invention belong.

The technologies, methods, and equipment known to those of ordinary skill in the relevant fields may not be discussed in detail, but where appropriate, the technologies, methods, and equipment should be regarded as part of the specification of a patent. In all examples shown and discussed herein, any specific value should be interpreted as merely exemplary, rather than as a limitation. Therefore, other examples of the exemplary embodiment may have different values.

EMBODIMENT

Figure 1:
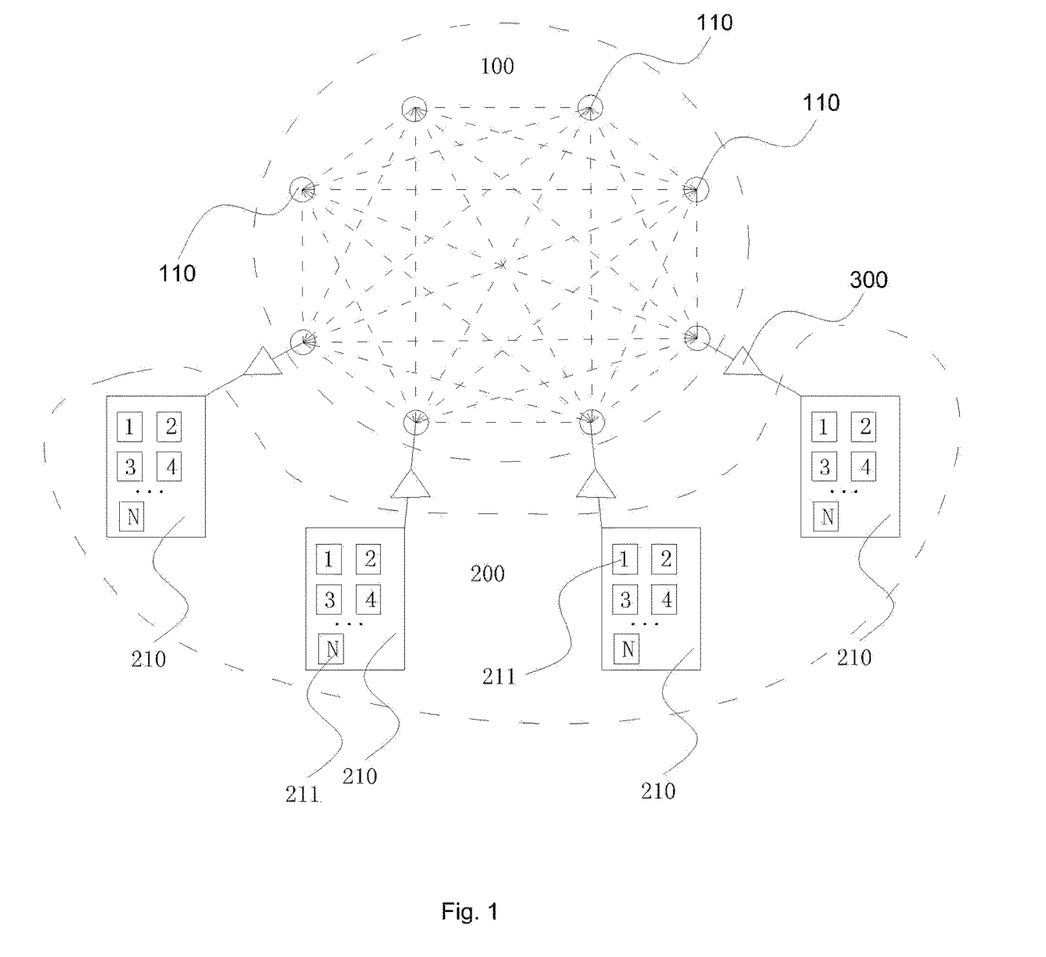
FIG. 1 is a first structural diagram of a network security system provided by an embodiment of the present invention.

As shown in FIG. 1, a blockchain-based network security system is provided in an embodiment of the present invention, which constructs a decentralized anti-attack network by the blockchain.

The blockchain refers to an architecture design method that realizes open, transparent, and traceable data, and is counted as a broadly defined blockchain. The broadly defined blockchain comprises four aspects: point-to-point network design, application of encryption technology, implementation of distributed algorithms, and use of data storage technology, as well as other related aspects including Distributed Storage, Machine Learning, VR, Internet of Things, and large Data etc. The narrowly defined blockchain only involves Data storage technology, Database or File Operations, etc. The blockchain in this application refers to the broadly defined blockchain.

The anti-attack network includes a blockchain network system 100 and a server system 200 which are independently arranged and the data link between them is connected via a switch 300. Of course, the switch 300 can also play a role in isolating the blockchain network system 100 from the server system 200.

The blockchain network system 100 comprises a plurality of block nodes 110 constituting a blockchain network, and each block node 110 constitutes a consensus node based on a consensus algorithm, then the blockchain uses a point-to-point communication and a consensus mechanism to achieve the purpose of decentralization; the information contained in the blocks on the chain is open and transparent to each block node 110 on the chain.

The block node 110 refers to a computer in a blockchain network, and includes but is not limited to various computing devices such as mobile phones, tablet computers, desktop computers, mining machines, and servers, etc. The subject who operates the aforementioned block node 110 may be any one or more users.

In this embodiment, multiple (at least two) block nodes 110 of the plurality of block nodes 110 are all provided with an anti-attack server 210, and each anti-attack server is provided with 1 to X sub-servers 211, where X is an integer greater than or equal to 2, and the multiple anti-attack servers 210 constitute the server system 200.

The path information in the access event is loaded into the blockchain network system 100 via the switch 300 connected to the anti-attack server 210, when the sub-server 211 of the anti-attack server 210 encounters an abnormal access event.

The sub-server 211 refers to a computer (computing device) that provides computing services in the server system 200, and includes but is not limited to various computing devices such as mobile phones, tablets, desktops, workgroup servers, departmental servers, etc.

In this embodiment, for the computer program or application A running on the sub-server 211, there may be $A_X$ sub-servers (X is an integer greater than or equal to 2, that is, corresponding to $A_1, A_2, A_3, \ldots, A_X$ sub-servers) in the entire anti-attack network. The $A_X$ sub-servers preferably belong to different anti-attack servers 210. In this way, when the sub-server 211 is attacked, a large amount of request information can be distributed to the sub-servers 211 of other anti-attack servers 210 by the blockchain network to prevent the depletion of resources of the attack prevention server where the attacked sub-server 211 is located. In the distribution process, the distributed technology of the blockchain network system 100 can fulfil the requirement of sharing and analyzing the abnormality detection results among many distributed block nodes 110.

The computer program or application, as an example and not a limitation, may comprise, e.g., an e-mail box, an online video client, a shopping platform, a payment platform, and the like.

As for the computer program or application running on the sub-server 211, it can be linked to the blockchain network system 100 via the switch 300 connected to the anti-attack server 210, so that the computer program or application corresponds to N sub-servers belonging to different anti-attack servers in the entire anti-attack network, wherein N is an integer greater than or equal to 2. In addition, the location information of the N sub-servers corresponding to the aforementioned computer program or application is exchanged by the block information in the blockchain network system 100, and the path information in the aforementioned abnormal access event is distributed to the N sub-servers. The location information may be, e.g., physical address information.

As an example and not a limitation, for example, an application A running on a sub-server (a desktop computer P) is connected to the switch 300 by the anti-attack server 210 (where the desktop computer P is located) and linked to the blockchain network system 100 via the switch 300, and the blockchain network system 100 is connected to other anti-attack servers via other switches. The anti-attack server includes multiple sub-servers B, and then the link relationship between the application A and the sub-server B is established, so that the application A can correspond to N sub-servers belonging to different locations in the entire anti-attack network, wherein N is an integer greater than or equal to 2. The physical address information of the N sub-servers corresponding to the aforementioned application A can be exchanged and shared by the block information in the blockchain network system 100, and the path information in the abnormal access event can be distributed to the N sub-servers.

In another implementation manner of this embodiment, the sub-server may be provided with a detection module and a transmission module.

The detection module is used to detect whether the access event is an abnormal DDoS access event.

The transmission module is used to send an abnormal access signal to the anti-attack server to which the sub-server network belongs when the access event is an abnormal DDoS access event.

Preferably, the situation determined as a DDoS abnormal access event is one of the following situations:

the frequency of access requests accepted by the computer program or application running on the sub-server is higher than the preset frequency;

there are a large number of TCP connections waiting on the sub-server; or the computer program or application running on the sub-server is flooded with a lot of useless data packets.

The network security system is constructed using the blockchain network system to protect against similar DDoS attack. For the abnormal access event of the attacked sub-server, the path information in the access event is loaded into the blockchain network system via the switch connected to the anti-attack server system where the attacked sub-server is located, so as to perform distributed processing. Blockchain, as a distributed technology, can fulfil the requirement of sharing and analyzing the anomaly detection results among many distributed block nodes and prevent the resource depletion of the anti-attack server where the attacked sub-server is located.

In another implementation of this embodiment, a parallel blockchain network can also be constructed, and each anti-attack server 210 can correspond to multiple (referring to more than two) independent blockchain network systems 100 by constructing the parallel blockchain network. For the computer program or application running on the sub-server, each request in the DDoS attack can be distributed to the multiple independent blockchain network systems 100 by a set of shunt system constructed by the multiple independent blockchain network systems connected to the anti-attack server and is responded respectively by a superposition of various blockchain network systems.

Figure 2:
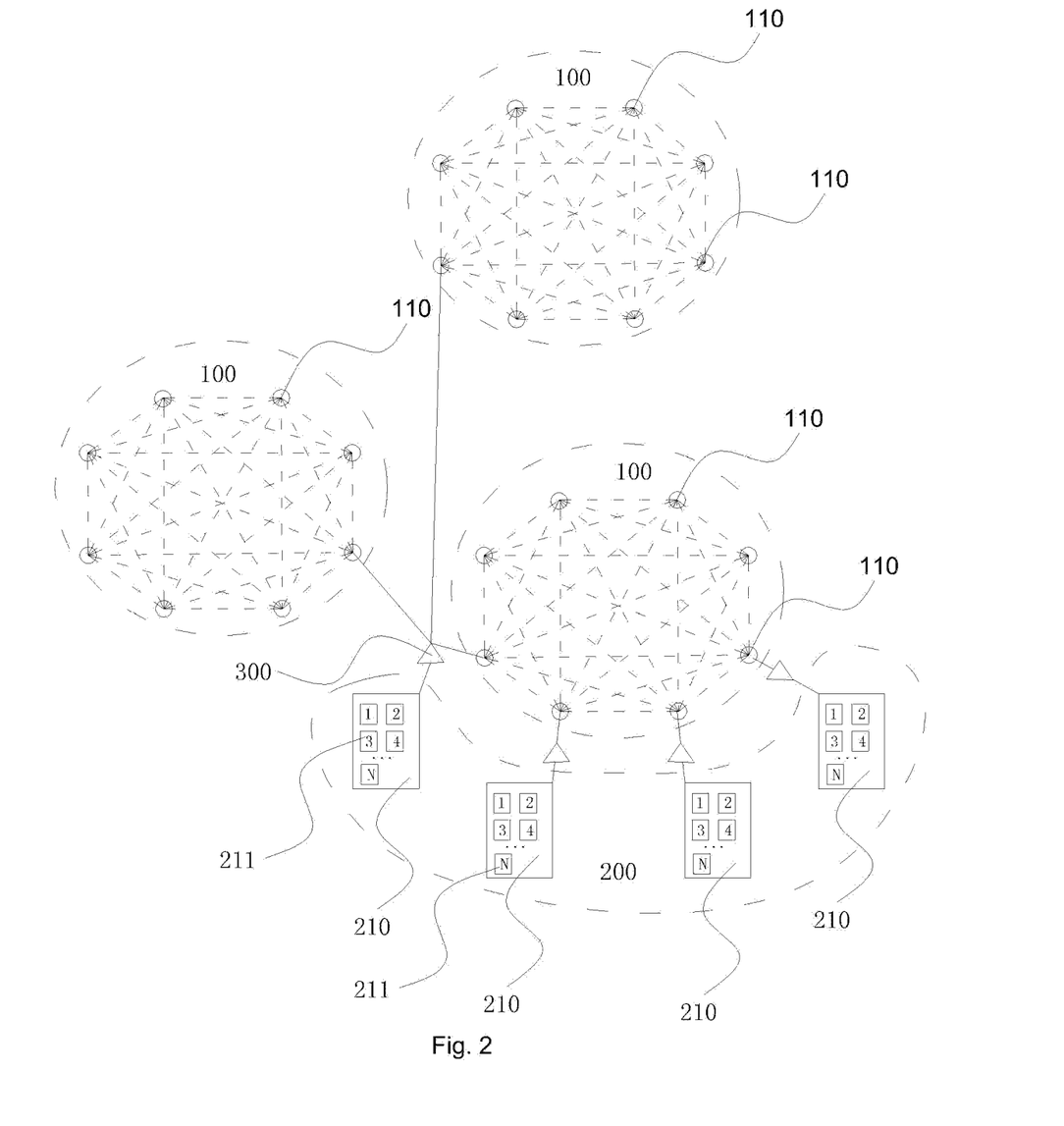
FIG. 2 is a second structural diagram of a network security system provided by an embodiment of the present invention.

For specific settings, as shown in FIG. 2, the data link between the anti-attack server 210 and the multiple independent blockchain network systems 100 is one common switch 300; the path information in the access event is loaded into any one or more of the multiple blockchain network systems 100 via the switch 300 when the abnormal access event is encountered.

Figure 3:
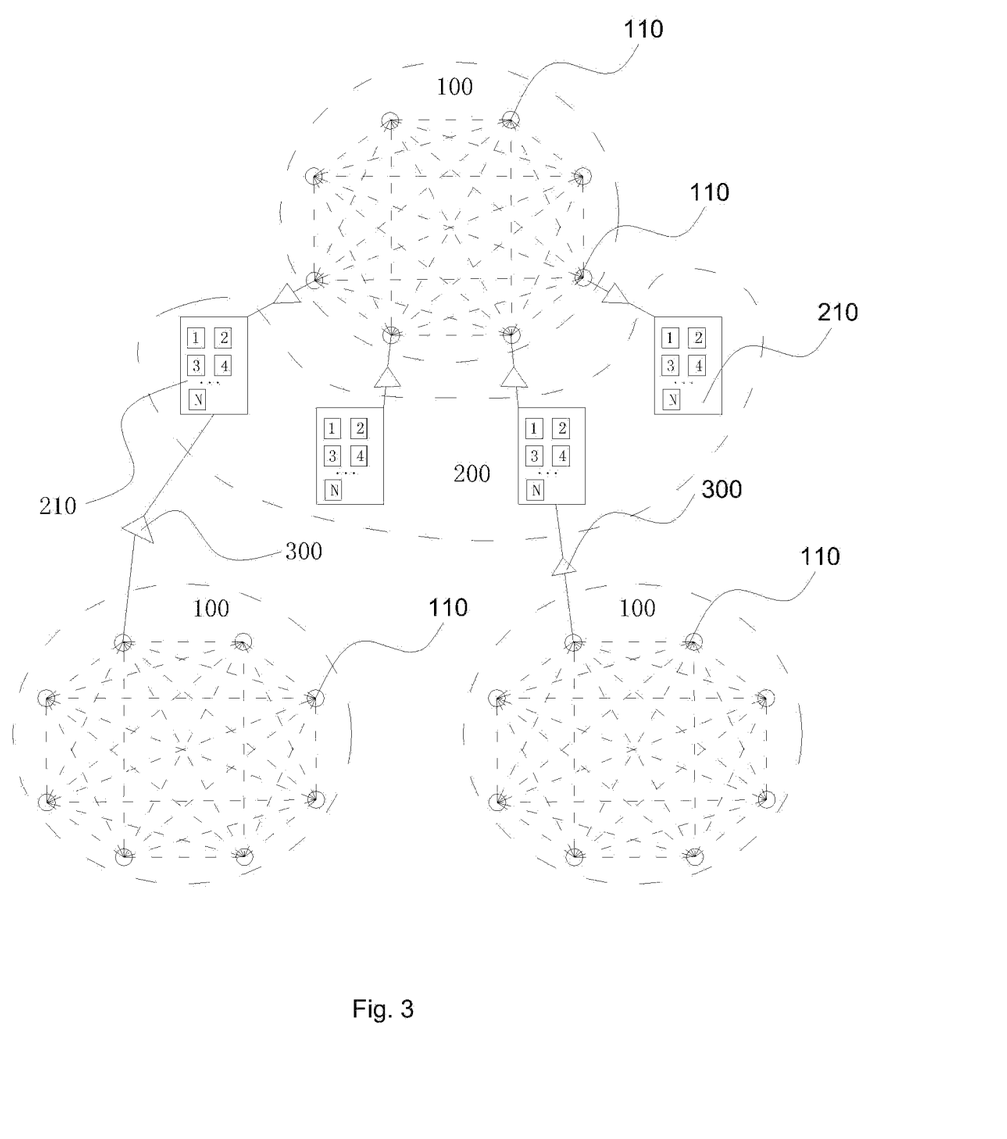
FIG. 3 is a third structural diagram of a network security system provided by an embodiment of the present invention.

Alternatively, as shown in FIG. 3, the data link between the anti-attack server 210 and each independent blockchain network system 100 is via a switch 300 set in a one-to-one correspondence, that is, each blockchain network system 100 is correspondingly provided with a switch 300. One or more of the switches 300 can be selected to load the path information in the access event into the corresponding blockchain network system 100, when an abnormal access event is encountered.

Figure 4:
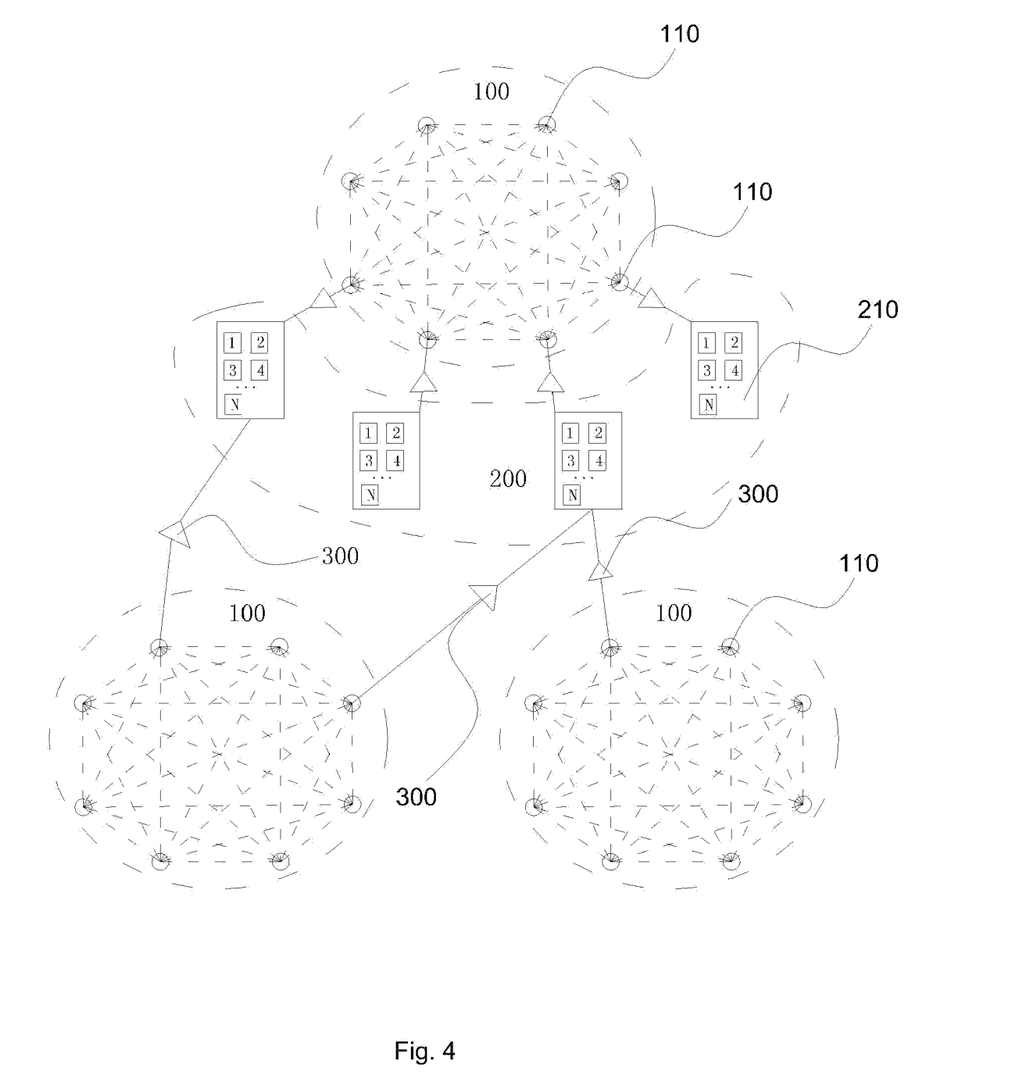
FIG. 4 is a fourth structural diagram of a network security system provided by an embodiment of the present invention.

Preferably, as shown in FIG. 4, multiple anti-attack servers 210 in the anti-attack network can be connected to the same two blockchain network systems 100, so that each request in the DDoS attack is distributed by the superposition of the blockchain network systems.

In this embodiment, preferably, different anti-attack servers 210 are connected to the blockchain network system 100 by different block nodes 110.

In another embodiment, at least one blockchain network system 100 of the multiple independent blockchain network systems 100 to which each of the anti-attack servers 210 corresponds is connected to other anti-attack networks, that is, the blockchain network system 100 also provides security services as a blockchain network system for other anti-attack networks.

A parallel blockchain network is constructed in the above manner, so as to construct a shunt system for the anti-attack server connected to the blockchain network. In the shunt system, when a sub-server in an anti-attack server sends a request, the anti-attack server selects one or more target blockchain networks from the parallel blockchain network via the switch and sends the events corresponding to the above request to the target blockchain network for offloading processing.

Of course, the multiple blockchain network systems can also be set priority level, and the target blockchain network system can be selected based on the priority level. As an example and not a limitation, for example, it is set to three levels: the first level, the second level, and the third level; the first level has the highest priority to be performed first for distributing information.

Figure 5:
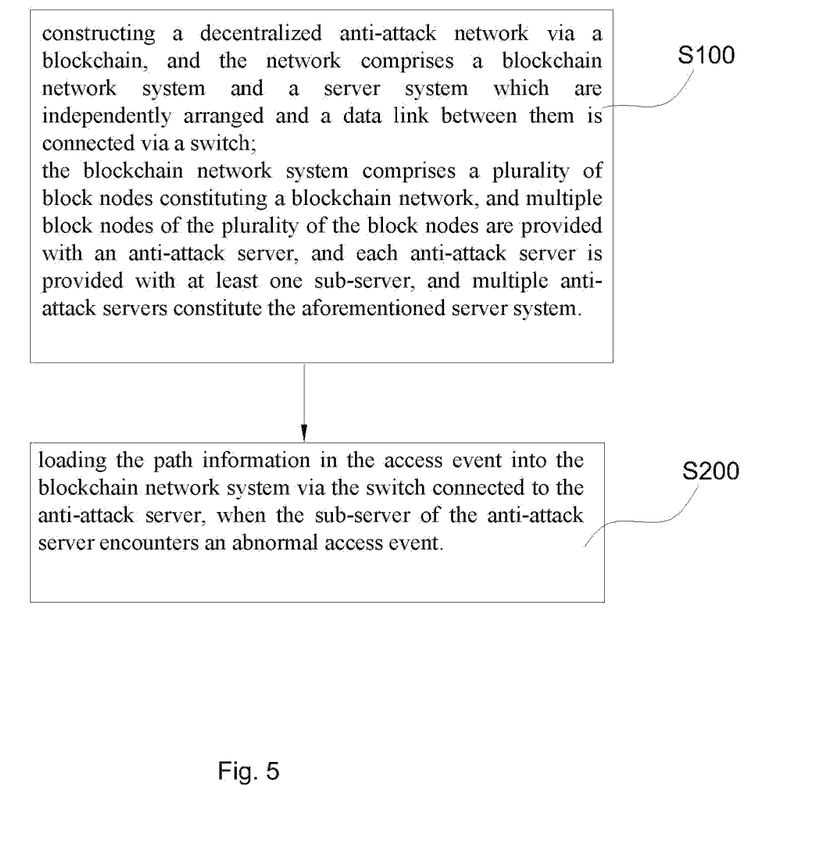
FIG. 5 is a flowchart of a network security processing method provided by an embodiment of the present invention.

As shown in FIG. 5, the present invention also provides a blockchain-based network security processing method comprising the following steps:

At step S100, constructing a decentralized anti-attack network via a blockchain, wherein the network comprises a blockchain network system and a server system which are independently arranged and a data link between them is connected via a switch;

the blockchain network system comprises a plurality of block nodes constituting a blockchain network, and multiple nodes of the plurality of block nodes are provided with an anti-attack server, and each anti-attack server is provided with at least one sub-server, and multiple anti-attack servers constitute the aforementioned server system.

At step S200, loading the path information in the access event into the blockchain network system via the switch connected to the anti-attack server, when the sub-server of the anti-attack server encounters an abnormal access event.

Furthermore, the method also comprises a step of exchanging location information of the sub-server with respect to the computer program or application running on the sub-server, and the step comprises:

linking the computer program or application running on the sub-server to the blockchain network system via the switch connected to the anti-attack server, so that the computer program or application corresponds to N sub-servers belonging to different anti-attack servers in the entire anti-attack network, wherein N is an integer greater than or equal to 2; and exchanging the location information of the N sub-servers corresponding to the computer program or application via the block information in the blockchain network system, and allocating the path information in the abnormal access event to the N sub-servers.

For other technical features, please refer to the previous embodiments, which will not be repeated here.

In the above description, the disclosure of the present invention is not intended to limit itself to these aspects. Rather, each component can be selectively and operatively combined in any number within the target protection scope of the present disclosure. In addition, terms like "comprise", "include", and "have" should be interpreted as inclusive or open by default, rather than exclusive or closed, unless they are clearly defined to the contrary. All technical, technological or other terms conform to the meaning understood by those skilled in the art, unless they are limited to the opposite meaning. Public terms found in dictionaries should not be interpreted too ideally or impractically in the context of related technical documents, unless they are explicitly defined in the present disclosure. Any changes or modifications made by those of ordinary skill in the field of the present invention based on the foregoing disclosure shall fall within the protection scope of the claims.

The invention claimed is:

1. A blockchain-based network security system for constructing a decentralized anti-attack network via a blockchain, wherein the anti-attack network comprises a blockchain network system and a server system which are independently arranged and a data link between them is connected via a switch;

wherein the blockchain network system comprises a plurality of block nodes for constituting a blockchain network, and multiple block nodes of the plurality of block nodes are provided with an anti-attack server, and each anti-attack server is provided with at least one sub-server, and multiple anti-attack servers constitute the aforementioned server system;

when the sub-server of the anti-attack server encounters an abnormal access event, path information in the aforementioned access event is loaded into the aforementioned blockchain network system via the switch connected to the anti-attack server;

wherein, for a computer program or application running on the sub-server, it is linked to the blockchain network system via the switch connected to the anti-attack server, so that the computer program or application corresponds to N sub-servers belonging to different anti-attack servers in the entire anti-attack network, wherein N is an integer greater than or equal to 2;

location information of the N sub-servers corresponding to the aforementioned computer program or application is exchanged via block information in the blockchain network system, and the path information in the aforementioned abnormal access event is distributed to the N sub-servers.

2. The blockchain-based network security system according to claim 1, wherein each anti-attack server corresponds to multiple independent blockchain network systems, and the data links between the anti-attack server and the multiple independent blockchain network systems are connected via a same switch; and the path information in the aforementioned access event is loaded into any one or more of the aforementioned multiple blockchain network systems via the aforementioned switch, when the abnormal access event is encountered.

3. The blockchain-based network security system according to claim 2, wherein at least one blockchain network system of the multiple independent blockchain network systems, to which each of the anti-attack servers corresponds, is connected to other anti-attack networks.

4. The blockchain-based network security system according to claim 2, wherein for the computer program or application running on the sub-server, each access event in the DDoS attack is distributed respectively by a set of shunt system constructed by the multiple independent blockchain network systems connected to the anti-attack server and is responded respectively by the superposition of various blockchain network systems.

5. The blockchain-based network security system according to claim 1, wherein each anti-attack server corresponds to multiple independent blockchain network systems, and the data link between the anti-attack server and each independent blockchain network system is connected via a switch set in a one-to-one correspondence; and one or more of the aforementioned switches are selected to load the path information in the aforementioned access event into the corresponding blockchain network system, when the abnormal access event is encountered.

6. The blockchain-based network security system according to claim 5, wherein at least one blockchain network system of the multiple independent blockchain network systems, to which each of the anti-attack servers corresponds, is connected to other anti-attack networks.

7. The blockchain-based network security system according to claim 5, wherein for the computer program or application running on the sub-server, each access event in the DDoS attack is distributed respectively by a set of shunt system constructed by the multiple independent blockchain network systems connected to the anti-attack server and is responded respectively by the superposition of various blockchain network systems.

8. The blockchain-based network security system according to claim 1, wherein the sub-server is provided with a detection module and a transmission module, wherein the detection module is configured to detect whether the access event is an abnormal DDoS access event; and the transmission module is configured to send an abnormal access signal to the anti-attack server to which the sub-server network belongs when the access event is an abnormal DDoS access event.

9. The blockchain-based network security system according to claim 8, wherein the situation determined as an abnormal DDoS access event is one of the following situations:

the frequency of access request accepted by the computer program or application running on the sub-server is higher than the preset frequency;

there are a large number of TCP connections waiting on the sub-server; or the computer program or application running on the sub-server is flooded with a lot of useless data packets.

10. A blockchain-based network security processing method for constructing a decentralized anti-attack network via a blockchain, wherein the anti-attack network comprises a blockchain network system and a server system which are independently arranged and a data link between them is connected via a switch;

the blockchain network system comprises a plurality of block nodes for constituting a blockchain network, and multiple block nodes of the plurality of block nodes are provided with an anti-attack server, and each anti-attack server is provided with at least one sub-server, and multiple anti-attack servers constitute the aforementioned server system;

wherein the method comprises:

when the sub-server of the anti-attack server encounters an abnormal access event, loading the path information in the aforementioned access event into the aforementioned blockchain network system via the switch connected to the anti-attack server;

and the method further comprises a step of exchanging location information of the sub-server with respect to the computer program or application running on the sub-server, which comprises:

linking the computer program or application running on the sub-server to the blockchain network system via the switch connected to the anti-attack server, so that the computer program or application corresponds to N sub-servers belonging to different anti-attack servers in the entire anti-attack network, wherein N is an integer greater than or equal to 2; and exchanging the location information of the N sub-servers corresponding to the aforementioned computer program or application via the block information in the blockchain network system, and distributing the path information in the aforementioned abnormal access event to the N sub-servers.

* * * * *